United States Patent [19]
Klabunde et al.

[11] Patent Number: 5,909,352
[45] Date of Patent: *Jun. 1, 1999

[54] ALTERNATOR CIRCUIT FOR USE IN A LIQUID LEVEL CONTROL SYSTEM

[75] Inventors: Robert G. Klabunde; Mark R. Ostlic, both of Detroit Lakes, Minn.

[73] Assignee: S.J. Electro Systems, Inc., Detroit Lakes, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,829

[22] Filed: May 29, 1996

[51] Int. Cl.⁶ .................................................. H01H 47/00
[52] U.S. Cl. ............................. 361/191; 361/167; 307/41
[58] Field of Search .................................. 361/167, 191, 361/194, 160, 166; 307/41

[56] References Cited

U.S. PATENT DOCUMENTS

| | | |
|---|---|---|
| 2,974,260 | 3/1961 | Stimler .................................... 361/167 |
| 3,009,082 | 11/1961 | Stimler et al. ........................... 361/167 |
| 4,040,119 | 8/1977 | Dalpee et al. ........................... 361/191 |
| 4,418,374 | 11/1983 | Callan ..................................... 361/191 |
| 4,652,802 | 3/1987 | Johnston . |
| 4,718,454 | 1/1988 | Appleby ................................. 361/167 |

*Primary Examiner*—Fritz Fleming
*Attorney, Agent, or Firm*—Vidas, Arrett & Steinkraus, P.A.

[57] ABSTRACT

An alternator circuit for alternately operating one of first and second electrical load devices which uses a magnetic latch relay to perform the alternation. The circuit includes a first circuit means for supplying electrical energy from a source to one of said first and second electrical load devices, and magnetic latch relay alternating means having first and second states. The alternating means in a first state interconnects the first electrical load device to the first circuit means, and in the second state interconnects the second electrical load device to the first circuit means. One application of the inventive circuit is for use in controlling the level of liquid in a container within a predetermined range using 2 pumps.

18 Claims, 4 Drawing Sheets

ALTERNATOR CIRCUIT FOR USE IN A LIQUID LEVEL CONTROL SYSTEM

FIELD OF THE INVENTION

The present invention relates to an alternator circuit, and more particularly to an improved alternator circuit arrangement for controlling the electrical energization of multiple load devices, such as two pumps for maintaining the level of a liquid in a container within a predetermined range.

BACKGROUND OF THE INVENTION

The present invention is an improvement over the alternator circuit arrangement disclosed in U.S. Pat. No. 4,652,802, the entire contents of which are hereby incorporated by reference. The alternator circuit of the '802 patent utilized a bi-stable relay in combination with an RC charging circuit for alternating between two devices, such as pump motors. The bi-stable relay is a mechanical part, and applicant has found it to be prone to mechanical failure. Also, because the charging circuit had to be completely charged before alternation could occur the '802 alternator circuit has been found to be undesirably slow. Finally, if power is completely removed from a circuit, such as during a power failure, a conventional alternating circuit will default back to selecting pump 1. Because pump 1 is used more, it experiences more wear than pump 2, which is undesirable.

What is needed is an improved alternator circuit which is faster and less prone to mechanical failure.

SUMMARY OF THE INVENTION

Applicant has solved the problems discussed above by inventing an alternator circuit for alternately operating one of first and second electrical load devices which uses a magnetic latch relay to perform the alternation. The circuit includes a first circuit means for supplying electrical energy from a source to one of said first and second electrical load devices, and magnetic latch relay alternating means having first and second states. The alternating means in a first state interconnects the first electrical load device to the first circuit means, and in the second state interconnects the second electrical load device to the first circuit means.

The inventive alternator circuit can be used in many applications, but is specifically described for use in controlling the level of liquid in a container within a predetermined range using 2 pumps.

The alternator circuit includes stop switch means (SS) and lead switch means (LS) to be closed and opened in predetermined sequences; first and second relays (CR1) and (CR2), and a magnetic latch relay comprised of a SET coil (CR3-S) and a RESET coil (CR3-R).

CR1, which when energized will energize the first load (pump 1), is connected to the source through the SS and LS in series, and through CR3-R 1st contacts (64a) in series with CR2 normally closed (NC) 1st contacts (42a), the CR1 normally open (NO) contacts closing and NC contacts opening upon energization of CR1.

CR2, which when energized will energize the second load (pump 2), is connected to the source through the SS and LS in series, and through CR3-S 1st contacts (62a) in series with CRI NC 1st contacts (28d), the CR2 NO contacts closing and NC contacts opening upon energization of CR2.

CR3-S is connected to the source through CR1 NO 2nd contacts (28b) in series with CR2 NC 2nd contacts (42b), the CR3-S contacts closing and the CR3-R contacts opening upon energization of CR3-S CR3-R is connected to the source through CR1 NC 3rd contacts (28f) in series with CR2 NO 3rd contacts (42d), the CR3-R contacts closing and the CR3-S contacts opening upon energization of CR3-R.

When CR1 is energized contacts 28d open, 28b close, 28f open, 28c closes and load 1 (for example pump 1) energizes and CR3-S is energized, which opens contacts 64a and closes contacts 62a, placing the alternating means in the second state and interconnecting the second load (pump 2) to the first circuit means, such that in the next sequence load 2 starts first.

DETAILED DESCRIPTION OF THE INVENTION

Figure 1:
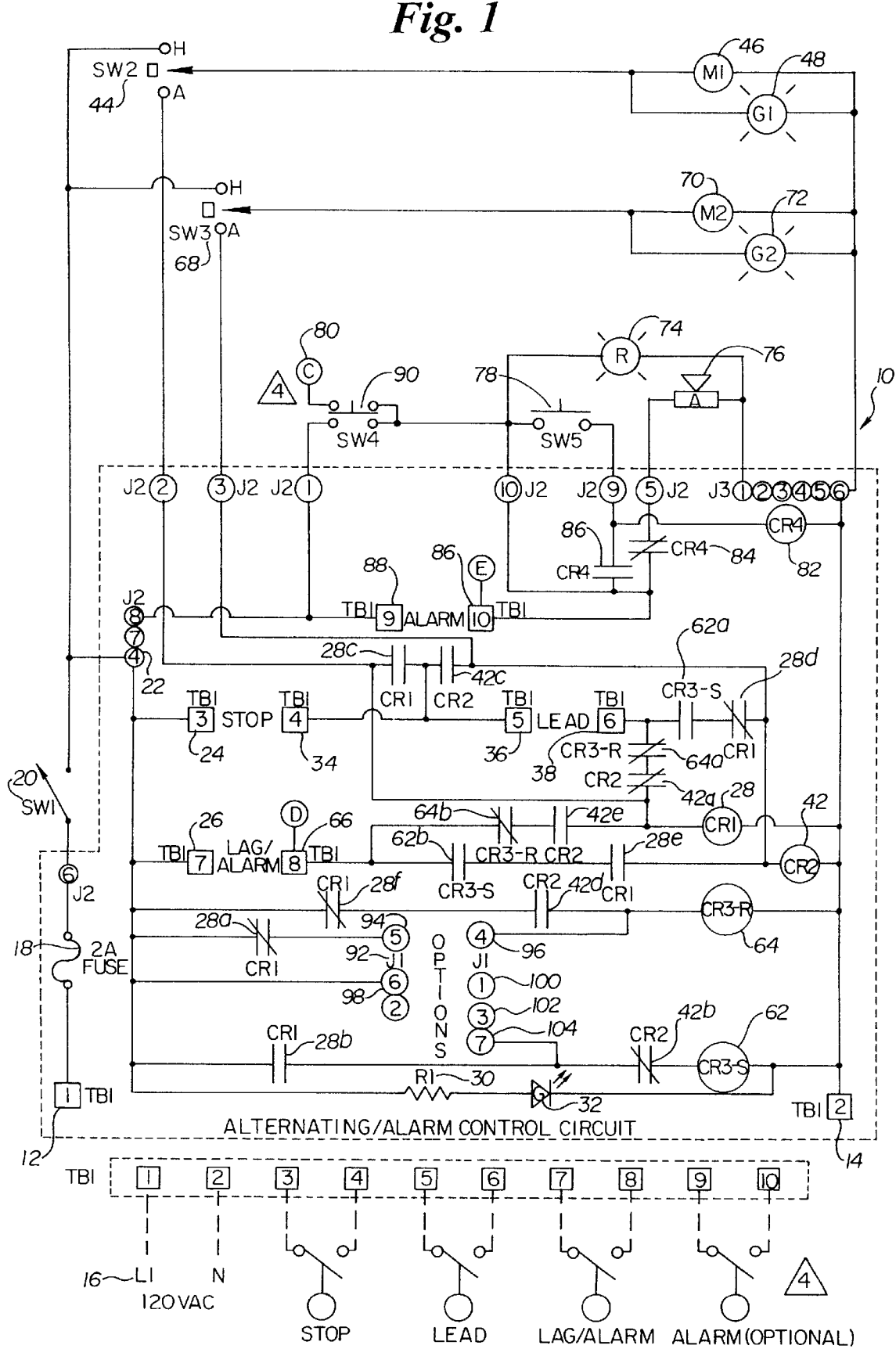
FIG. 1 is an electrical schematic of a first inventive alternator circuit arrangement.

Referring now to FIG. 1, a schematic representation of a circuit board is shown generally at 10. Incoming power is connected to the circuit board through terminals 1 and 2, shown respectively at 12 and 14. The incoming power line L1, shown at 16 travels through a fuse 18, located in a fuseholder soldered to the circuit board. The power then runs through a toggle switch SW1, shown at 20, which toggles power on and off for the entire circuit board. The power re-enters the circuit board at 22 and runs to terminal 3, shown at 24, terminal 7 shown at 26, normally closed first relay contacts 28a, normally open first relay contacts 28b and current limiting resistor 30.

The power proceeds through current limiting resistor 30 to green LED 32, causing the LED 32 to glow when incoming power is applied, switch 20 is closed and fuse 18 is not blown.

This circuit arrangement is meant to control and alternate on successive cycles, two load devices, such as two motors for wastewater pumps, water pumps, air compressors and the like. Although the circuit of FIG. 1 will be described in connection with two motors for use in a sump pump, it should be understood that the circuit could be used to alternate any two load devices.

Figure 2:
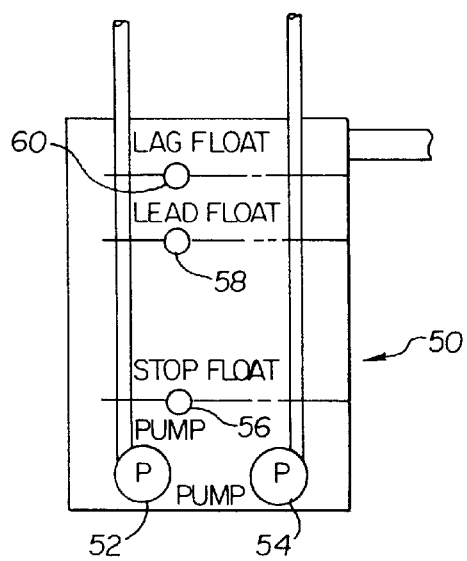
FIG. 2 is a standard sump pump.

Referring now to FIG. 2, a prior art sump pump is shown generally at 50, with two pumps 52 and 54, and a STOP FLOAT 56, LEAD FLOAT 58 and LAG FLOAT 60. The design and operation of sump pumps is well known in the art and will not be discussed in detail herein.

Referring now to FIGS. 1 and 2, the power at 24 will transfer to terminal 4, shown at 34 when the STOP FLOAT 56 closes the terminals 24 and 34. A LEAD FLOAT 58 is connected between terminals 5 and 6, shown at 36 and 38. When both the STOP FLOAT 56 and LEAD FLOAT 58 close, power will transfer to 38, through normally closed third relay contacts CR3-R 64a, normally closed second relay contacts 42a and energizes first relay CR1, shown at 28. As is well known in the art, when the relay 28 is energized, all normally open CRI contacts close and all normally closed CR1 contacts open. Therefore, when CRI 28 is energized, contacts 28c are closed, which in turn allows power to reach switch SW2, shown at 44. If switch 44 is in the "auto" mode and closed, power will also energize magnetic contactor M1 and indicator light G1, shown respectively at 46 and 48, thereby causing pump 1, shown at 52 in FIG. 2, to be activated.

At this point pump 52 should be drawing liquid out of the tank and eventually, the LEAD FLOAT 58 will open. M1 at 46 will still be energized because the power will pass through the STOP FLOAT 56 at terminals 24 and 34, through 28c to continue energizing first relay CR1 at 28.

Alternation, which ensures that on the next cycle pump 2, shown at 54 in FIG. 2, will be the "lead" pump, also occurs during the initial energization of CR1, shown at 28, by means of CR3, which is a set/reset magnetic latch relay with a SET coil shown at 62 and a RESET coil shown at 64. Because the CR3 relay is a magnetic latch relay, the SET contacts will remain SET until the RESET coil is energized. This allows the alternator circuit 10 to "remember" which pump is next in sequence after a power failure. When the SET coil is energized, then contacts labeled CR3-R will be open and contacts labeled CR3-S will be closed.

When CR1 28 is energized, the normally open CR1 contacts at 28b will close, continue through normally closed CR2 contacts 42b, energizing the CR3-S set coil 62. At this time normally open CR3-S contacts at 62a will close. However, since CR1 28 is energized, normally closed CR1 contacts 28d have opened, preventing power from energizing second relay CR2, shown at 42, so that pump 2, shown at 54 in FIG. 2 will not be activated at this point. CR3-R contacts at 64a will open so that on the next pumping cycle CR1 28 cannot be energized. CR3-R contacts at 64b will open and CR3-S contacts at 62b will close. Since CR1 28 is still energized, CRI contacts 28e will be closed.

If the LAG FLOAT 60 closes power will pass through terminals 26 and 66, now closed CR3-S contacts 62b, now closed CR1 contacts 28e and energize CR2, shown at 42. Power also passes through switch SW3, shown at 68, which in "auto" mode is closed, to energize magnetic contactor M2 and indicator light G2, shown respectively at 70 and 72, thereby causing pump 2, shown at 54 in FIG. 2, to be activated. Pump 2 will then remain on until the STOP FLOAT 56 opens, because power will feed through terminals 24 and 34, through now closed 42c, keeping CR2 42 energized, and pump 2 on. When the STOP FLOAT 56 opens, CR1 28 and CR2 42 are no longer energized and both pumps 1 and 2 will stop. This completes the first cycle.

If the LAG FLOAT 60 is not closed during the cycle, when the STOP FLOAT 56 opens, CR1 28 is no longer energized and pump 1 will stop. This also completes the first cycle.

On the next cycle when the STOP FLOAT 56 closes power will pass through 24 and 34. When the LEAD FLOAT 58 closes, power feeds through 36 and 38. Since on the last sequence CR3-S at 62 was set, contacts CR3-S at 62a will be closed. From 38 power will feed through 62a and 28d to energize CR2 42. As discussed above this will also energize M2 70 and G2 72 and thus start pump 2 (54 in FIG. 2).

At this point pump 2 should be drawing liquid out of the tank and eventually, the LEAD FLOAT 58 will open. M2 at 70 will still be energized because power will pass through the STOP FLOAT terminals 24 and 34, then through 42c to continue to energize CR2 42.

Again, alternation ensuring that on the next cycle pump 1 will be the LEAD PUMP occurs during the initial energization of CR2 42. Since CR1 28 is not energized, power will flow through 28f. Because CR2 42 is energized power will continue through 42d energizing the CR3-R(reset) coil at 64.

As discussed above, when 62 is energized CR3-R contacts open and CR3-S contacts close. When 64 is energized CR3-R contacts close and CR3-S contacts open. Therefore, at this time CR3-R contacts 64a will close. However, since CR2 42 is energized power cannot pass through contacts 42a to energize CR1 28, which at this point in the cycle is not desired. CR3-S contacts at 62a will open so that on the next pumping cycle CR2 42 cannot be energized. CR3-R contacts 64b will close and CR3-S at 62b will open. Since CR2 42 is still energized, CR2 contacts 42e will be closed. This is needed so that pump 1 will start if the LAG FLOAT 60 should close.

If the LAG FLOAT 60 closes power will pass through terminals 26 and 66, through 64b and 42e to energize CR1 relay 28. As discussed above this activates pump 1, which will remain on until the STOP FLOAT 56 opens, which stops both pumps 1 and 2.

Continuing in the second sequence, pump 2 should be running and the liquid is lowering so that the LEAD FLOAT 58 opens. When the STOP FLOAT 56 opens, power can no longer energize CR2 42, so pump 2 will stop. As mentioned above, CR3 contacts are now RESET (CR3-S are open and CR3-R are closed). This completes the second cycle. Subsequent cycles simply alternate between the first and second cycles described above.

The circuit board shown in FIG. 1 also has circuitry for alarm functions. The board is designed for industry standard 3 or 4 float system. In a 3 float system, the alarm goes off whenever both pumps are running (in the auto mode only). In a 4 float system, the alarm goes off when an independent "fourth" float is switched closed and when the float is switched open the alarm will go off.

The alarm circuitry consists of a red beacon 74 and horn 76. When the alarm goes off, the horn 76 may be silenced by pressing a silence switch 78.

In a THREE FLOAT SYSTEM, a jumper wire from 80 to terminal position 8, shown at 66. When the LAG FLOAT closes (assuming both the STOP and LEAD FLOAT are closed), power will feed through terminals 26 and 66. Assuming pump 1 is the lead pump, CR3-S at 62b will be closed and CR3-R at 64b will be open. Power will then flow through 62b, and since pump 1 is running CR1 is energized and therefore 28e will be closed to energize CR2 42. Pump 2 will then start, as discussed above. Also, since a jumper wire is placed from 80 to 66, power will feed through to red beacon 74 and horn 76. If the alarm silence switch 78, power will feed through the switch 78 and energize relay CR4 at 82. When CR4 82 is energized, CR4 contacts at 84 will open while CR4 contacts at 86 will close. When this happens power to the horn 76 is removed and thus the horn silenced. Power will continue to keep the CR4 coil energized until the LAG/ALARM FLOAT 60 opens. At this point power is removed from 82 and the relay goes back to its initial state, so that on the next alarm condition both the beacon and the horn will be simultaneously activated.

In a FOUR FLOAT SYSTEM a jumper wire from 80 is placed in terminal position 10, shown at 86. When the alarm float 60 closes, power will energize the red beacon 74 and horn 76. If the alarm silence switch 78 is pressed, power feeds through to energize CR4 82, so that CR4 contacts at 84 will open while CR4 contacts at 86 will close. When this happens power to the horn 76 is removed and thus the horn silenced. Power will continue to keep the CR4 coil energized until the ALARM FLOAT opens across terminals 88 and 86. At this point power is removed from 82 and the relay goes back to its initial state, so that on the next alarm condition both the beacon and the horn will be simultaneously activated.

The beacon 74 and 76 can be tested by pressing switch SW4 at 90, which turns on the beacon and horn 74 and 76.

The circuit 10 is also configured to accept a 3 position double pole double throw selector switch at 92. The switch 92 is soldered so that the switch becomes part of the board assembly. If switch 92 is left in the center position, the circuit 10 will be in "normal" mode alternating the pumps on successive cycles. If the switch is placed in the lower position, pump 1 will always be the lead pump on every cycle while pump 2 will be the backup pump, which would start when the "lag" float closes. If the switch is placed in the upper position, pump 2 will always be the lead pump on every cycle while pump 1 will be the backup pump which would start when the "lag" float closes.

If the selector switch 92 is positioned in the "lower" position, a closed circuit (short) will appear across jumper terminals 5 and 4, shown respectively at 94 and 96, and jumper terminals 6 and 1, shown respectively at 98 and 100. Assuming that all floats are in the "off" position, power will feed through 94 and 96 and energize CR3-R coil 64. Contacts 62a will be open while contacts 64a will be closed. When the stop and lead float close, CR1 28 will energize and pump 1 will start. Since CR1 28 is energized, contacts 28a will open and remove power from 64 so that CR3-R is no longer energized. Contacts 28b are closed so power will energize CR3-S 62. At this point contacts 62a will close while contacts 64a will open. Since CR1 28 energized, pump 1 will remain on because CR1 will be energized through contacts 28c until the stop float opens (M1 will then de-energize stopping pump 1). When the stop float opens, power is cut from CR1 28 so it will de-energize. Contacts 28a will close feeding power through 94, 96 and will energize CR3-R coil 64. Contacts 62a will be open while contacts 64a will be closed. When the stop and lead float close, power will feed through and energize CR1 28. Thus pump one is again the Lead pump.

Pump two will be the lag pump when the selector switch 92 is in the "lower" position. Whenever pump 1 is running, CR3-S coil 62 is always energized. If the Lag float switch closes power will pass through and energize CR2 42, which energizes M2 70 and G2 72. Pump two will then remain on until the stop float opens because power will feed through contacts 42c keeping CR2 42 energized and pump 2 will remain on.

If the selector switch 92 is positioned in the "upper" position, a closed circuit (short) will appear across 98 and 102, and 94 and 98. Assuming that all floats are in the "off" position, power will feed through 94, 98, 102, 104, contacts 42b and will energize the CR3-S coil 62. Contacts 62a will be closed while contacts 64a will be opened. When the stop and lead float close, power will energize CR2 42, starting pump 2. Since CR2 coil 42 is energized, contacts 42b will open and remove power from 62 so that CR3-S is no longer energized. Contacts 42d is closed so power will energize CR3-R 64. At this point contacts 62a will open while contacts 64a will close. Since CR2 42 is energized, pump 2 will remain on because CR2 will be energized through contacts 42c until the stop float opens, stopping pump 2. When the stop float opens, power is cut from CR2 42 so it will de-energize, causing contacts 42b to close, energizing CR3-S coil 62. Contacts 62a will be closed while contacts 64a will be opened. When the stop and lead float close, power will feed through and energize CR2 coil 42. Thus pump two is again the Lead pump.

Pump one will be the lag pump when the selector switch 92 is in the "upper" position. Whenever pump 2 is running, CR3-R 64 is always energized. If the Lag float switch closes power will energize CRI 28, starting pump 1, which will remain on until the stop float opens because power feeds through contacts 28c keeping CR1 28 energized, and pump 1 on.

If the selector switch is positioned in the "center" position, the board will be in the normal "alternating" mode.

If the lead/lag selector switch is desired to be mounted remotely from the board, a 4 position terminal block is placed on the board and wires are run to the remote switch.

Figure 3A:
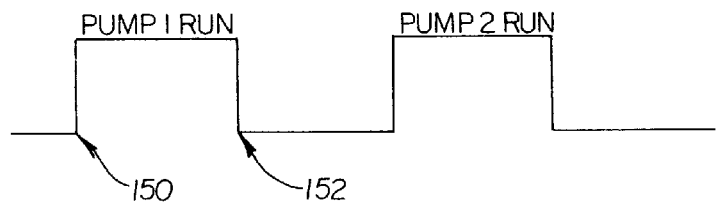
FIG. 3 (3a,3b) is a timing diagram comparison between a conventional alternator and the inventive alternator circuit.
Figure 3B:
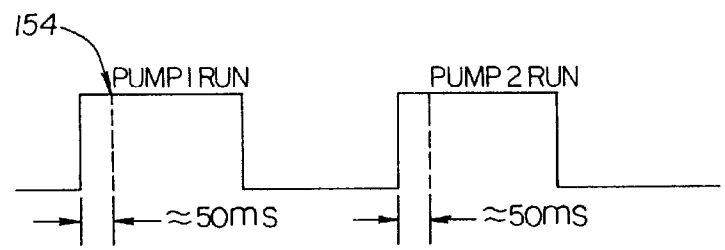

FIG. 3a shows the timing diagram of a conventional alternating relay. When the pump 1 selection is set, shown at 150, pump 1 is run and the pump 2 selection is not made until pump 1 is de-energized, shown at 152. FIG. 3b shows that the inventive alternating circuit makes the selection for the next sequence pump while current pump is running. The pump 2 selection is set, shown at 154 approximately 50 milliseconds after the pump 1 selection is set and pump 1 is energized.

Figure 4:
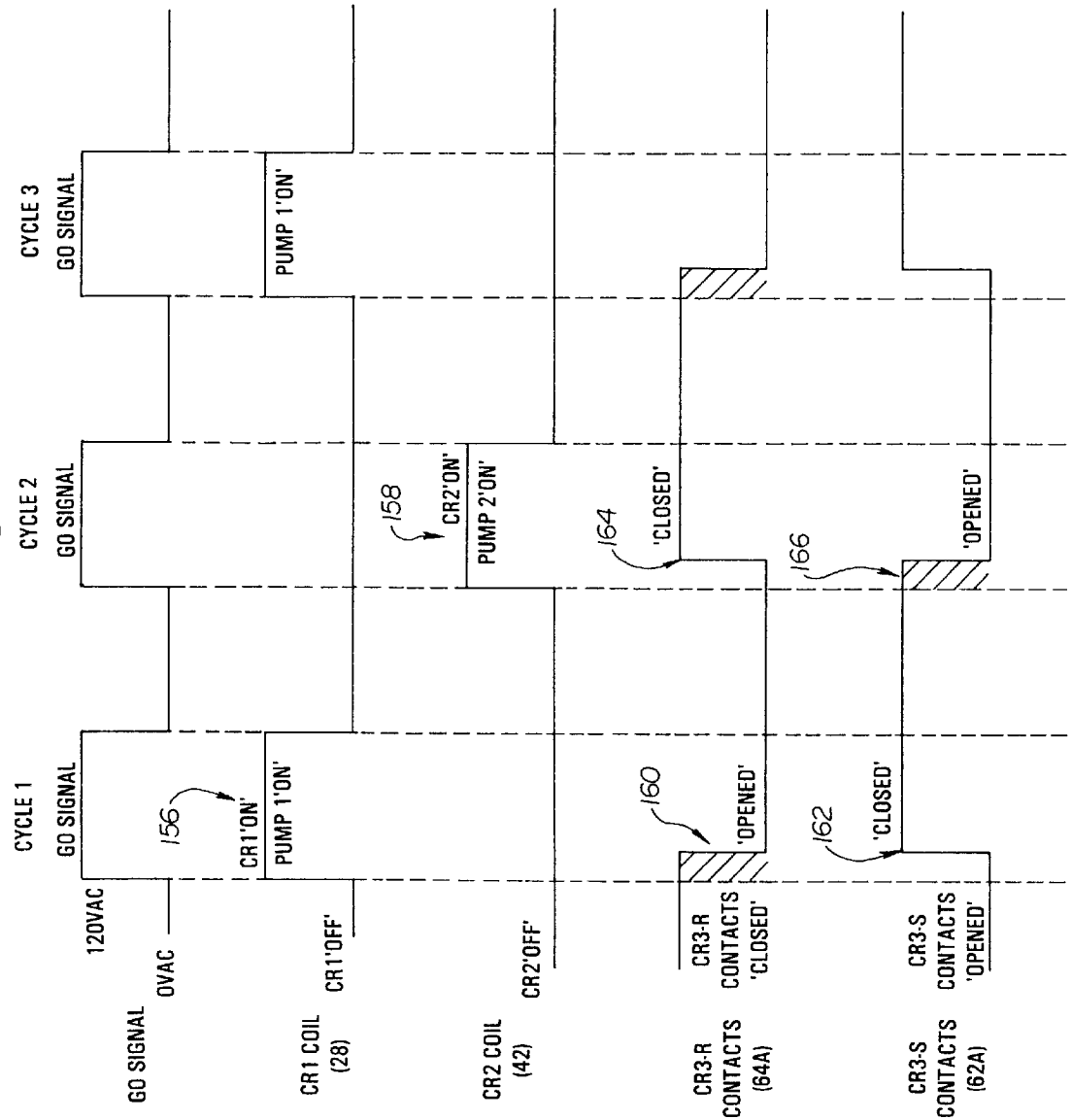
FIG. 4 is a timing diagram showing the timing of various circuit components.

FIG. 4 is a timing diagram showing the GO signal and the timing of the CR1 coil (28), CR2 coil (42), the Reset coil CR3-R contacts (64a) and the Set coil CR3-S contacts (62a). When the GO signal goes on in the first cycle, CR1 goes on, shown at 156. In the second cycle, when the GO signal goes on CR2 goes on, shown at 158. Approximately 50 milliseconds after CR1 goes on in the first cycle, the contacts 64a are opened and 62a are closed, shown respectively at 160 and 162, which represents the pump 2 selection being set, as discussed in connection with FIG. 3b. The 50 milliseconds represents the time it takes the contacts 64a and 62a to seat (open or close). The pump 1 selection is shown being made approximately 50 milliseconds after CR2 goes on, shown at 164 and 166.

Figure 5A:
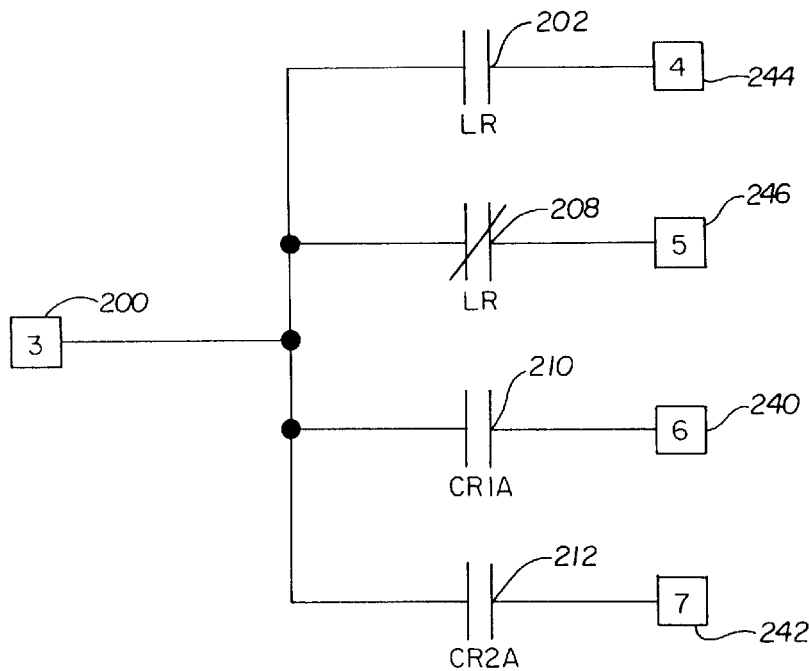
FIGS. 5a and 5b are an electrical schematic of a second inventive alternator circuit arrangement.
Figure 5B:
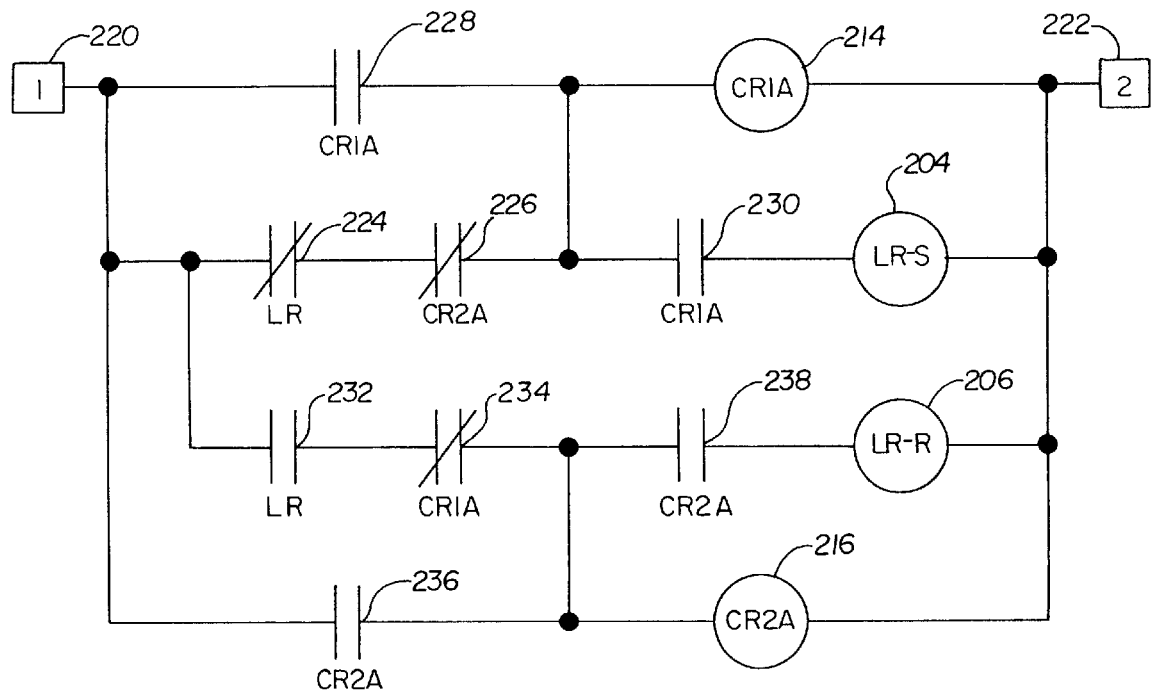

Referring now to FIGS. 5a and 5b, a simplified electric alternator circuit without alarm circuitry is shown. The electric alternator is used in applications where alternation of pumps, motors, and compressors is desired. It can also be used in applications where the reversing of motors is required on successive cycles. This invention performs the "alternating" function similarly to that discussed above in connection with FIG. 1. The circuit does not contain any alarm circuitry. This circuit also has a unique dry contact output arrangement that provides a great deal of flexibility for applications requiring alternation.

The output consists of a common point at terminal block position 3, 200, which requires its own power source. The common can be switched between four switch arrangements. LR is a magnetic latching relay that has two coils. One coil will "set" the contacts (removal of power from the set coil will not cause the contacts to return to the initial state because the contacts are held together magnetically). The other coil will "reset" the contacts (removal of power from the reset coil will not cause the contacts to return to the previous state because the contact are held together magnetically). Normally open contacts 202 will close if coil LR-S 204 is energized, and will remain closed until coil LR-R at 206 is energized, causing contacts 202 to open again. If power is being applied to 200, then it will flow through closed contacts 202 to terminal 244. Similarly, contacts 208 are normally closed and will open upon energizing 204, and will close when energizing 206, thereby allowing power applied at 200 to flow to 246. Contacts 210 and 212 will close when coils CR1A 214 and CR2A 216 become energized respectively, allowing any power applied at 200 to flow through to 240 or 242 respectively. Removing power from coils CR1A 214 or CR2A 216 will cause contacts 210 and 212 to open. In summary, LR contacts will remain "maintained" after power is removed from the board while contacts CR1A 210 and CR2A 212 will go back to the initial state (normally open) when power is removed from the board.

Upon the application of a "go" signal which is 120 VAC applied to terminal block positions 1 and 2, shown respectively at 220 and 222. In a 120 VAC system, L1 will be the "hot" line while N will be the "neutral" line. Power will feed through contacts 224 and 226 to energize CRIA 214. This will cause contacts 228 to close and power will feed through contacts 228 to keep coil 214 energized until power is removed from 220. Contacts 230 will also close and power will feed through 228 and 230 and energize LR-S 204. This will cause contacts 224 to open and contacts 232 to close, which performs the alternation so that on the next sequence CR2 coil 216 will be the first relay to energize. Even though contacts 232 are closed, since contacts 234 is open, power cannot feed through to energize CR2 coil 216. Because coils CR1A 214 and LR-S 204 are energized, contacts 202 and 210 will be closed. If power is removed from 220, contacts 202 will remain closed while contacts 210 will open. This completes the first cycle.

On the second cycle, upon the application of a "go" signal, power will feed through contacts 232, 234 and energize CR2A 216. This will cause contacts 236 to close and power will feed through 236 to keep coil CR2A 216 energized until power is removed from 220. Contacts 238 will also close and power will energize LR-R 206. This will cause contacts 224 to close and contacts 232 to open, which performs the alternation so that on the next sequence CR1 coil will be the first relay to energize. Even though contacts 224 are closed, since contacts 226 are open, power cannot feed through to energize CR1 coil 214. Because coils CR2A 216 and LR-R 206 are energized, contacts 208 and 212 will be closed. Contacts 202 will be open. If power is removed from 220, contacts 208 will remain closed while CR2A contacts 212 will open. This completes the second cycle. Subsequent cycles alternate between the first cycle and the second cycle.

This circuit arrangement is considered inventive because of the output choices. In a normal pump alternating application magnetic contactors could be used to alternate pumps and the pump 1 contactor coil could be connected to 240, and the pump 2 contactor coil could be connected to 242. Another application may require a closed contact at all times even if power is removed. This is accomplished with the LR contacts shown at 244 and 246.

One application in which the 4 outputs 244, 246, 240 and 242 could be used when the reversing of motors is required on successive cycles. Outputs 240 and 242 could alternate between the two motors, while outputs 244 and 246 could alternate between forward and reverse or clockwise or counterclockwise motor directions.

Another application could be to use outputs 244 and 246 to control an indicator light which indicates which pump is on, or which pump was on last cycle.

The alternating circuit arrangements discussed above require 120 volts AC (VAC) for operation. However, it should be understood that other control voltages can be used, such as 24 VAC simply by changing the rating of the relays and matching the coil voltage to the control circuit voltage. It should also be understood that DC components can easily be used by incorporating an AC to DC conversion circuit. The relay contact outputs between 200 and 244, 246, 240 or 242 are dry contacts and may be used with voltages up to 240 VAC.

The general purpose relays (CR1 and CR2 for example) are OMRON MY4-AC 120 or equivalent, while the magnetic latching relays (CR3 and LR for example) are OMRON MY2K-US-AC120 or equivalent.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An alternator circuit for changing between first and second states and alternately operating one of first and second electrical load devices; comprising:

a) first circuit means for supplying electrical energy from a source to one of said first and second electrical load devices, and b) magnetic latch relay alternating means having first and second states, the magnetic latch relay alternating means in a first state interconnecting the first electrical load device to the first circuit means, and in the second state interconnecting the second electrical load device to the first circuit means, wherein the magnetic latch relay alternating means is free of a capacitor used to change states, and wherein changing states takes less than approximately 50 milliseconds, the magnetic latch relay alternating means remaining in its existing state upon power failure.

2. The alternator circuit of claim 1 wherein the first and second electrical load devices are first and second pumps for use in controlling the level of liquid in a container within a predetermined range.

3. An alternator circuit for alternately operating one of first and second electrical load devices; comprising:

first circuit means for supplying electrical energy from a source to one of said first and second electrical load devices;

magnetic latch relay alternating means having first and second states, the alternating means in a first state interconnecting the first electrical load device to the first circuit means, and in the second state interconnecting the second electrical load device to the first circuit means, wherein the first and second electrical load devices are first and second pumps for use in controlling the level of liquid in a container within a predetermined range:

a) the first circuit means is comprised of:
  1) stop switch means (SS) and lead switch means (LS) to be closed and opened in predetermined sequences;
  2) a first relay (CR1);
  3) a second relay (CR2), and b) the magnetic latch relay alternating means is comprised of:
  1) a SET coil (CR3-S);
  2) a RESET coil (CR3-R), and further wherein c) CR1, which when energized will energize the first pump, is connected to the source through the SS and LS in series, and through CR3-R 1st contacts (64a) in series with CR2 normally closed (NC) 1st contacts (42a), the CR1 normally open (NO) contacts closing and NC contacts opening upon energization of CR1;

d) CR2, which when energized will energize the second pump, is connected to the source through the SS and LS in series, and through CR3-S 1st contacts (62*a*) in series with CR1 NC 1st contacts (28*d*), the CR2 NO contacts closing and NC contacts opening upon energization of CR2;

e) CR3-S is connected to the source through CR1 NO 2nd contacts (28*b*) in series with CR2 NC 2nd contacts (42*b*), the CR3-S contacts closing and the CR3-R contacts opening upon energization of CR3-S;

f) CR3-R is connected to the source through CR1 NC 3rd contacts (28*f*) in series with CR2 NO 3rd contacts (42*d*), the CR3-R contacts closing and the CR3-S contacts opening upon energization of CR3-R;

whereby when CR1 is energized contacts 28*d* open, 28*b* close, 28*f* open and pump 1 starts and CR3-S is energized, which opens contacts 64*a* and closes contacts 62*a*, placing the alternating means in the second state and interconnecting the second pump to the first circuit means, such that in the next sequence pump 2 starts first.

4. The alternator circuit of claim 3 further including:

a) a lag/alarm switch (AS), and wherein b) CR1 is connected to the source through AS in series with CR3-R 2nd contacts (64*b*) and CR2 NO 4th contacts (42*e*);

c) CR2 is connected to the source through AS in series with CR3-S 2nd contacts (62*b*) and CR1 NO 4th contacts (28*e*);

whereby when CR1 is energized and pump 1 starts, contacts 28*e* close, and when CR3-S is energized, contacts 64*b* open and 62*b* close, so that when switch AS closes CR2 is energized and pump 2 starts.

5. The alternator circuit of claim 4 wherein:

a) CR1 is also connected to the source through SS and CR1 NO 5th contacts (28*c*);

b) CR2 is also connected to the source through SS and CR2 NO 5th contacts (42*c*);

whereby when CR1 is energized, contacts 28*c* are closed, continuing to energize CR1 when contacts 64*a* are opened, and when CR2 is energized, contacts 42*c* are closed, continuing to energize CR2 when contacts 62*a* are opened, but when the SS is opened CR1 and/or CR2 are de-energized, stopping pumps 1 and/or 2.

6. The alternator circuit of claim 5 further including alarm means.

7. The alternator circuit of claim 6 wherein the alarm means is comprised of a horn and a red beacon, and where the alarm means is activated when both pumps are running.

8. The alternator circuit of claim 6 wherein the alarm means is comprised of a horn and a red beacon, and where the alarm means is activated by an alarm switch closed by a fourth float.

9. The alternator circuit of claim 7 further including a silencer switch, which when pressed deactivates the horn.

10. The alternator circuit of claim 5 further including a lead/lag selector switch having center, lower and upper positions, such that when the selector switch is in the center position the pumps will alternate on successive cycles, when the selector switch is in the lower position, pump 1 will always be the lead pump while pump 2 will be the backup pump which starts when the AS switch closes, when the selector switch is in the upper position, pump 2 will always be the lead pump while pump 1 will be the backup pump which starts when the AS switch closes.

11. The alternator circuit of claim 3 wherein changing states takes approximately 50 milliseconds and where the circuit changes state and alternates the two loads during the time period when the current load is energized.

12. An alternator circuit for alternately operating one of first and second electrical load devices; comprising:

a) a first relay (CR1) having four sets of contacts, normally open contacts (240), normally open contacts (228), normally closed contacts (234) and normally open contacts (230);

b) a second relay (CR2) having four sets of contacts, normally open contacts (212), normally open contacts (236), normally closed contacts (226) and normally open contacts (238);

c) a magnetic latch relay alternating means comprised of a SET coil (LR-S), a RESET coil (LR-R), and LR contact means;

d) CR1, which when energized will close contacts (210) to supply electrical energy from a source to a first electrical load device, is connected to the source through normally closed LR contacts (224) in series with normally closed second relay contacts (226), normally open first relay contacts (240), (228), and (230) closing and normally closed first relay contacts (234) opening when the first relay CR1 is energized;

e) CR1 also being connected to power through normally open first relay contacts (228);

f) CR2, which when energized will close contacts (212) to supply electrical energy from a source to a second electrical load device, is connected to the source through normally open LR contacts (232) in series with normally closed first relay contacts (234), normally open second relay contacts (212), (236), (238) closing and normally closed second relay contacts (226) opening when the second relay CR2 is energized;

g) CR2 also being connected to power through normally open second relay contacts (236);

h) LR-S is connected to CR1 through normally open first relay contacts (230), contacts 230 being closed when CR1 is energized, thereby energizing LR-S, which places the LR contacts in their SET positions by opening normally closed LR contacts (224) and closing normally open LR contacts (232);

i) LR-R is connected to CR2 through normally open second relay contacts (238), contacts 238 being closed when CR2 is energized, thereby energizing LR-R, which RESETS the LR contacts (232) and (224) to their normal positions, whereby when CR1 is energized contacts 210 are closed causing the first load to energize, contacts 230 close energizing LR-S which SETS the LR contacts so that contacts 224 are opened and contacts 232 are closed, thereby alternating the relays CR1 and CR2 so that on the next sequence CR2 will energize, closing contacts 212 causing the second load to energize, contacts 238 closing to energize LR-R which RESETS the LR contacts to their normal positions, thereby alternating the relays CR1 and CR2.

13. The alternator circuit of claim 12 wherein the magnetic latch relay means further includes normally open LR contacts (202) and normally closed LR contacts (208), and where (202) is closed to energize a third load when CR1 is energized, and (208) is closed to energize a fourth load when CR2 is energized.

14. The alternator circuit of claim 13 wherein the contacts (210) and (212) are used to alternately energize pumps 1 and 2 respectively, and contacts (202) and (208) are used to alternately run the energized pump clockwise and counterclockwise.

15. An alternator circuit for changing between first and second states and alternately operating one of first and second electrical load devices; comprising:

a) a power supply which supplies electrical energy to one of said first and second electrical load devices, and b) a magnetic latch relay alternator having first and second states, the magnetic latch relay alternator in a first state interconnecting the first electrical load device to the power supply, and in the second state interconnecting the second electrical load device to the power supply, wherein the magnetic latch relay alternator is free of a charging RC circuit used to change states, and wherein changing states takes less than approximately 50 milliseconds, the magnetic latch relay alternator remaining in its existing state upon power failure.

16. The alternator circuit of claim 15 wherein the first electrical load device is designated the LEAD load device, and wherein an alternation cycle is defined as the LEAD load device being connected and disconnected from the power supply, and further including first and second relays which are connected to the power supply and the magnetic latch relay alternator such that when the first relay is energized the magnetic latch relay alternator is placed in its second state such that the second electrical load device is designated the LEAD load device, and when the second relay is energized the magnetic latch relay alternator is placed in its first state such that the first electrical load device is designated the LEAD load device.

17. The alternator circuit of claim 16 wherein the first and second electrical load devices are LEAD and LAG pumps for use in controlling the level of liquid in a container within a predetermined range, the alternator circuit is operatively connected to a LEAD float, a LAG float and a STOP float, when the LEAD float reaches a predetermined level in the container the LEAD pump is activated, when the LAG float reaches a predetermined level in the container the LAG pump is activated and when the stop float reaches a predetermined level in the container the LEAD pump, and LAG pump if energized, are de-energized.

18. The alternator circuit of claim 17 wherein when the magnetic latch relay alternator is placed in its second state the LAG pump becomes the LEAD pump which energizes first in the next cycle, and the LEAD pump becomes the LAG pump.

* * * * *